(12) United States Patent
Surjaatmadja et al.

(10) Patent No.: US 6,837,523 B2
(45) Date of Patent: Jan. 4, 2005

(54) PIPING WITH INTEGRAL FORCE ABSORBING RESTRAINING SYSTEM

(75) Inventors: Jim B. Surjaatmadja, Duncan, OK (US); Melissa Bergman, Houston, TX (US); Brent Johnson, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 24 days.

(21) Appl. No.: 10/313,717

(22) Filed: Dec. 5, 2002

(65) Prior Publication Data

US 2004/0108715 A1 Jun. 10, 2004

(51) Int. Cl.⁷ ............................................. F16L 35/00
(52) U.S. Cl. .......................................... 285/114; 285/1
(58) Field of Search ................................ 285/2, 1, 114, 285/117

(56) References Cited

U.S. PATENT DOCUMENTS

| | | | |
|---|---|---|---|
| 672,556 A | | 4/1901 | Hunick |
| 1,671,706 A | * | 5/1928 | Hooper ........................ 285/64 |
| 2,402,003 A | | 6/1946 | Zublin |
| 2,536,216 A | | 1/1951 | Powell |
| 2,661,963 A | * | 12/1953 | Brown et al. ................ 285/114 |
| 2,756,022 A | | 7/1956 | Sturgeon |
| 3,026,807 A | * | 3/1962 | Anderson et al. .............. 417/50 |
| 3,084,957 A | | 4/1963 | Caldwell |
| 3,206,229 A | | 9/1965 | Kramer |
| 3,232,638 A | | 2/1966 | Hollander |
| 3,516,300 A | * | 6/1970 | Mukinhaupt ............... 74/500.5 |
| 3,527,481 A | | 9/1970 | Lewis |
| 3,699,950 A | * | 10/1972 | Humphrey et al. .......... 600/249 |
| 3,866,953 A | * | 2/1975 | Thastrup ...................... 285/47 |
| 4,192,143 A | * | 3/1980 | Haegele ....................... 60/322 |
| 4,204,707 A | * | 5/1980 | Lincicome et al. ......... 285/114 |
| 4,470,621 A | * | 9/1984 | Irvine ......................... 285/114 |
| 4,549,332 A | * | 10/1985 | Pouliot ......................... 24/335 |
| 4,826,219 A | | 5/1989 | Proehl |
| 5,273,321 A | | 12/1993 | Richter |
| 5,507,533 A | * | 4/1996 | Mumma ...................... 285/114 |
| 5,873,608 A | * | 2/1999 | Tharp et al. ................ 285/114 |
| 6,354,521 B1 | * | 3/2002 | Kusilek et al. ............. 239/600 |

FOREIGN PATENT DOCUMENTS

CH          425373          11/1966

OTHER PUBLICATIONS

SPE 24619 entitled "Restraining System to Help Contain Well Flowlines and Equipment During Rupture for Increased Safety" by J.L. Stromberg et al., dated Oct., 1992.
Article entitled "Modeling Forces Created By Energized Fluid Emitting From Ruptured Tubing" by Jim B. Surjaatmadja et al. dated 1993.

* cited by examiner

Primary Examiner—James M. Hewitt
(74) Attorney, Agent, or Firm—John W. Wustenberg; Rodney B. Carroll

(57) ABSTRACT

A force absorbing restraining system for a number of pipe sections, each having an integral restraining system which is subsequently connected and works in conjunction with the integral restraining system of adjacent pipe sections. It is known that during an explosive failure either of a pipe section or a joint between pipe sections, a tremendous amount of reaction force is generated by escaping effluent flow. This force, in turn, may energize equipment such as pipes, pumps, and the like to exhibit uncontrolled motion often at a rate of several hundred feet per second. The restraining system of the present invention is designed to absorb a sudden burst of explosive energy and to lessen the reaction forces generated by the explosion so as to ensure that equipment does not move about a service site in an uncontrolled manner which could injure people and damage buildings or other equipment. In short, the force absorbing restraining system in accordance with the present invention reduces the effects of impact loading during explosive failure by dissipating energy in the permanent mechanical deformation of an integral restraining tube assembly attached to each pipe section.

21 Claims, 1 Drawing Sheet

PIPING WITH INTEGRAL FORCE ABSORBING RESTRAINING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to safety mechanisms for use in high-pressure piping systems. More specifically, the present invention relates to a piping system comprised of individual pipe sections each having an integral force absorbing restraining system in the event of pipe or joint failure. The restraining system incorporates a novel energy absorbing system to reduce the effects of impact loading during explosive failure.

BACKGROUND OF THE INVENTION

It is common in the oil well service industry to pump various high-pressure fluids and proppants, such as sand, into an oil containing deposit to fracture the oil containing strata and increase oil production rates. High-pressure fluid is transported from the pump to the well via flowlines which are typically constructed of a number of service pipe sections connected in series. During an actual fracturing operation, there is always a remote chance of a mechanical failure occurring in one of the flowlines. A mechanical failure may occur in a single pipe section or at a joint where two pipe sections meet. A failure or rupturing of the pipes or other attached equipment, namely pumps and the like, creates a surge of fluid that rapidly flows through the rupture, producing a reaction force that may cause the flowlines to move uncontrollably. Accordingly, restraining equipment should be used which is able to dissipate energy quickly enough to prevent flowlines and other equipment from exhibiting uncontrolled motion.

SUMMARY OF THE INVENTION

The force absorbing restraining system according to the present invention is formed by using a number of pipe sections, each having an integral restraint system which is subsequently connected and works in conjunction with the integral restraining system of adjacent pipe sections. It is known that during an explosive failure either of a pipe section or a joint between sections, a tremendous amount of force is generated. This force, in turn, may energize equipment such as pipes, pumps, and the like to exhibit uncontrolled motion often at a rate of several hundred feet per second. The restraining system of the present invention is designed to absorb a sudden burst of explosive energy and to lessen the reaction forces generated by the explosion so as to ensure that equipment does not move about a service site in an uncontrolled manner which could injure people and damage buildings or other equipment. In short, the force absorbing restraining system in accordance with the present invention reduces the effects of impact loading during explosive failure by dissipating energy in the permanent mechanical deformation of an integral restraining tube assembly attached to each pipe section.

BRIEF DESCRIPTION OF THE DRAWINGS

The present invention will be better understood in view of the detailed description in conjunction with the following drawings in which like reference numbers refer to like parts in each of the figures and in which.

DETAILED DESCRIPTION OF THE PREFERRED EMBODIMENTS

Figure 1:
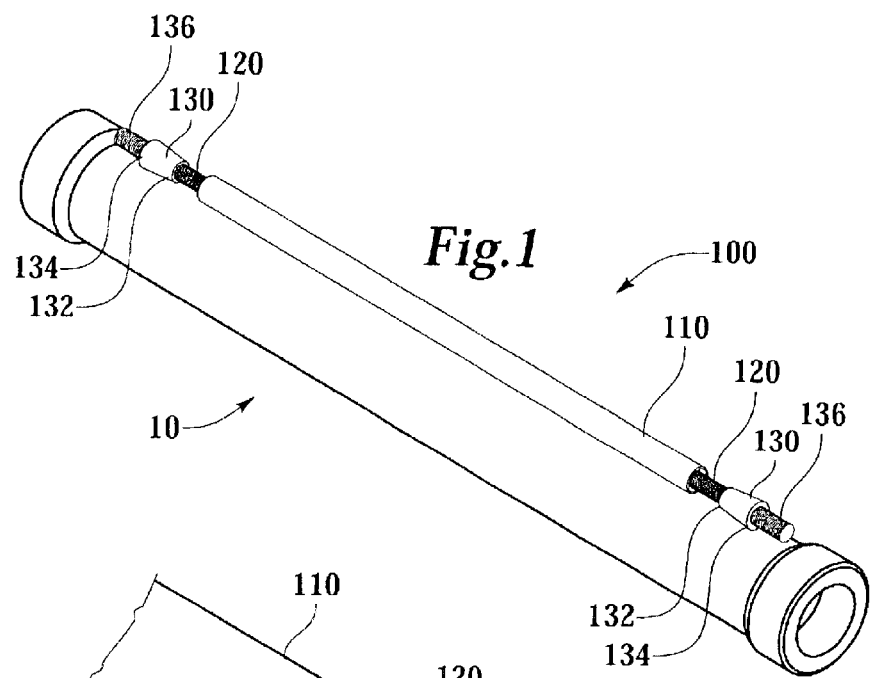
FIG. 1 is a perspective view of a single pipe section fitted with an integral force absorbing restraining system in accordance with the present invention.

It is common in the oil well service industry to pump various high-pressure fluids and proppants, such as sand, into an oil containing deposit to fracture the oil containing strata and increase oil production rates. High-pressure fluid is transported from the pump to the well via flowlines which are typically constructed of a number of service pipe sections connected in series. During a fracturing operation, there is always a remote chance of a mechanical failure occurring in the flowlines. When an oil well service pipe containing high-pressure energized fluid ruptures, the resulting effluent generates large reaction forces on the pipe and other equipment. The restraining system used should be able to dissipate energy quickly enough to prevent the flowline from exhibiting uncontrolled motion. In practice, most damage occurs within the first few seconds after the equipment ruptures. The large reaction forces generated by escaping effluent fluid flow can cause flowlines in other equipment to move in an uncontrolled manner at extremely high rates of speed, often in excess of several hundred feet per second. Obviously, while there is only a very small chance that such a catastrophic failure will occur in an oil well servicing operation, the potential damage to both people and equipment is such that safety mechanisms are essential and should be suitable for use with the energized fluid selected for a particular operation.

When an oil well servicing operation uses a relatively incompressible liquid, the potential explosive force of an escaping effluent flow is relatively small, although injuries might still result from the sudden movement of the piping. Conventional tie-downs such as steel cabling wrapped around various pieces of equipment and anchored to the ground, may be enough to prevent further damage or injuries. The use of energized fluids, however, can be very hazardous. This is particularly true of fluids such as pressurized gases and foams which may be far more compressed than most liquids. Tests have shown that energized fluids, such as pressurized nitrogen, can create significantly larger reaction forces over longer periods of time when failure occurs. See generally, J. Surjaatmadja et al., "Modeling Forces Created By Energized Fluids Emitting From Ruptured Tubing", ASME Contributed Papers in Fluids Engineering, FED-Vol. 170 (1993), incorporated in its entirety herein by reference.

As it is becoming increasingly more common to use energized fluids in oil well servicing operations, conventional steel cable tie-down safety mechanisms may no longer be the most suitable. With energized fluids, restraining equipment designed merely to contain reaction forces may be inadequate. Even small amounts of slack in the cable system may permit escaping effluent energy to be converted into kinetic energy by the movement of the flowlines. An effective restraining system for energized fluids should reduce the generation of kinetic energy by dissipating energy from released fluid before it can be converted. The integral force absorbing restraining system constructed in accordance with the present invention is particularly applicable to onshore well sites where well stimulation is performed using energized fluids.

Referring now to FIG. 1, a perspective view of a single pipe section 10 fitted with an integral force absorbing restraining system 100 in accordance with the present invention is shown. The restraining system 100 includes a restraining tube 110, a cable or wire rope 120, and a tube expander 130. The pipe section 10 may be a metal tube formed of steel or other suitable alloys and typically has an outer diameter of about 3 to 4 inches. The restraining tube 110 may also be steel or other suitable metal alloy and welded to an exterior of the pipe section 10. For a 3 to 4 inch diameter pipe section 10, the restraining tube 110 may range in size from about ½ inch to about 1 inch in diameter and contains the wire rope 120 which runs the entire length of the restraining tube 110 and typically extends about 1 inch from either end. By way of example only, two suitable forms of wire rope 120 would be DYFORM wire rope, an 18 wire HSLR high-strength low-rotation wire rope, which in a ⅜ inch size is able to sustain loading up to about 8.3 tons or about 18,600 pounds, and in a 7/16 inch size is able to sustain loading of about 11.2 tons or about 25,100 pounds. The tube expander 130 is secured to the wire rope 120 extending from the restraining tube 110 at opposite ends.

Figure 2:
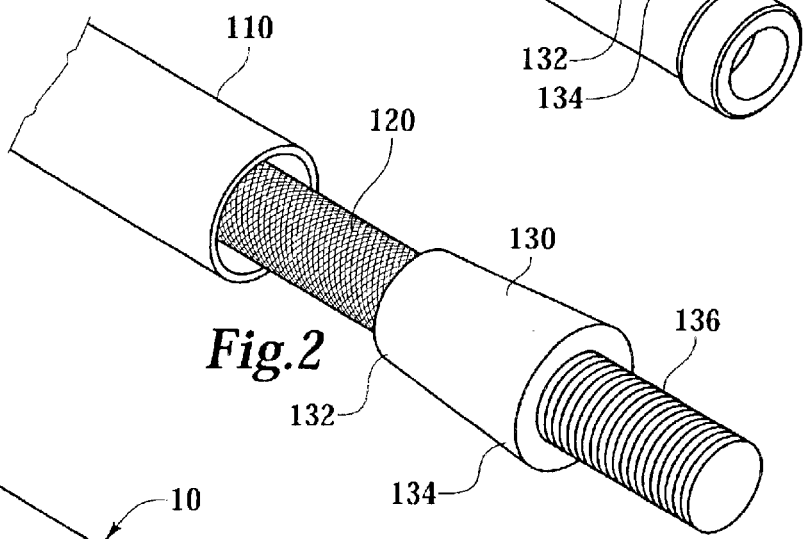
FIG. 2 is a detailed perspective drawing showing a restraining tube, wire rope, and tube expander elements of the integral force absorbing restraining system.

Referring now to FIG. 2, a detailed perspective drawing is provided to better illustrate the restraining tube 110, wire rope 120, and tube expander 130 of the restraining system 100. For simplicity, the pipe section 10 to which the restraining tube 110 is welded or attached is not shown. The tube expander 130 is a hardened metal fitting having a tapered design with a diameter at a smaller end 132 being slightly less than an inner diameter of the restraining tube 110 and a diameter at a larger end 134 being slightly greater than the inner diameter of the restraining tube 110. Under impact loading conditions, its tapered shape allows the tube expander 130 to smoothly enter the restraining tube 110 and then expand the restraining tube 110 as it is drawn inward. The process of uniformly expanding or stretching the restraining tube 110 in plastic deformation permanently distorts the restraining tube 110 and dissipates a tremendous amount of energy in the process. Note that the end of the tube expander 130 which is not coupled to the wire rope 120 extends outward in a bolt portion 136. The bolt portion 136 of the tube expander 130 is usually threaded for connection to the restraining system 100 of an adjacent pipe section 10 or other devices.

Figure 3:
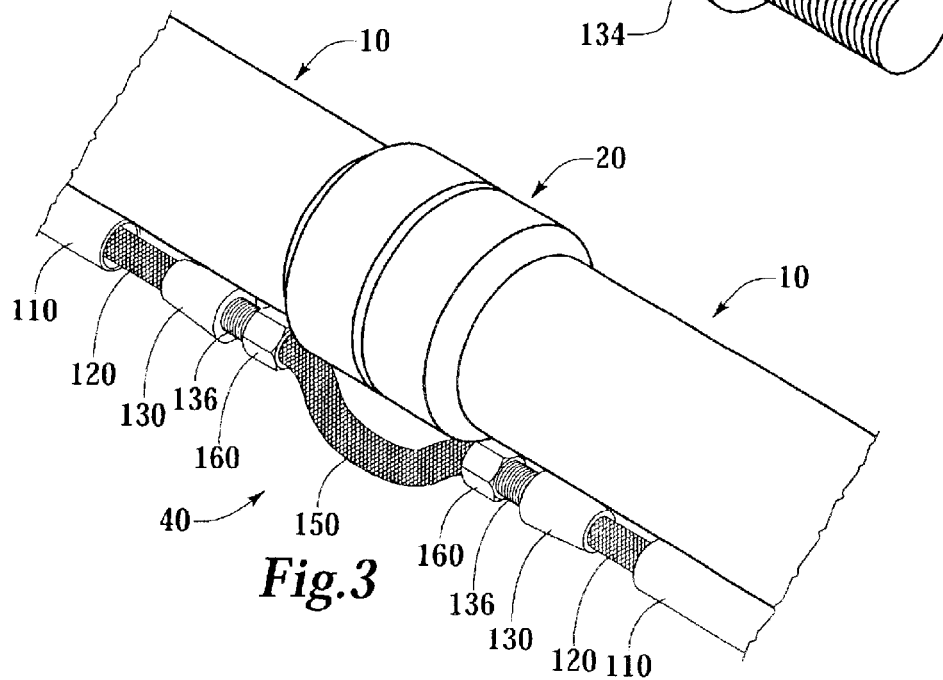
FIG. 3 is a detailed perspective drawing of a joint between two sections of pipe each featuring the integral force absorbing restraining system in accordance with the present invention, and illustrates the connection assembly which serves to transfer loads between the restraining tubes of adjacent pipe sections.

Referring now to FIG. 3, a detailed perspective drawing illustrates a joint 20 between two pipe sections 10 and a connection assembly 40 which serves to transfer loads between the restraining system 100 of adjacent pipe sections 10. Following the connection of the pipe sections 10 by means known in the art, a braided metal wire rope 150 similar to that held within the restraining tubes 110 and fitted with connection nuts 160 at either end is used to join the restraining systems 100 of two adjacent pipe sections 10 together. In one preferred embodiment, this connection would be made by hand turning the connection nuts 160 about the bolt portions 136 of the tube expanders 130. Hand turned connections would be preferred primarily for ease of implementation. Although, hand turned connection nuts 160 and bolt portions 136 are indicated as being preferred, it is possible to carry out the present invention with various other connectors as known in the art which would be suitable for linking wire rope or cable and which could sustain mechanical loading up to and in excess of the rated load values of the wire rope itself. These connections are critically important to the system as a whole. The connection assembly 40 ensures protection across joints 20 between pipe sections 10 and allows the impact loading forces associated with an explosion to be distributed across a number of pipe sections 10 connected in series.

In operation, a number of pipe sections 10 featuring the integral restraining system 100 may be joined together to pump energized fluids in an oil well servicing operation. Each pipe section 10 is fitted with the restraining system 100 welded to its exterior and each restraining system 100 is connected using wire ropes 150, connection nuts 160, and bolt portions 136 or other fasteners as known in the art. If a failure occurs in a particular pipe section 10 or at a joint 20 between two pipe sections 10, impact loading forces would be exerted upon the wire rope 120 which runs the length of the entire piping system. The tube expander 130 will then be drawn or extruded through the restraining tube 110 in a controlled manner as it expands the restraining tube 110. The tapered shape of the tube expander 130 allows it to enter the restraining tube 110 at one end smoothly but will not permit it to slide through without expanding the restraining tube 110 by deforming it in a plastic manner. Usually, the tube expander 130 and the restraining tube 110 should be sized to achieve about 0.5% to about 2% increase in diameter by deformation in the restraining tube 110 as the tube expander 130 is drawn through it. This expansion of the restraining tube 110 will expend a great deal of energy and will be multiplied by tube expanders 130 entering restraining tubes 110 down the line of pipe sections 10 which have been joined to the failed pipe section 10 in the series.

Note that the metal alloys selected for construction of the restraining tube 110 and the tube expander 130 may be of various compositions, but that it is important to form the tube expander 130 of a material which is significantly harder than that of the restraining tube 110 such that it is drawn through the length of the restraining tube 110 and expands it in a controlled manner. If the tube expander 130 were made of a softer material, it is possible that the tube expander 130 itself will become deformed and slide more freely down the interior of the restraining tube 110 rather than deforming the restraining tube 110 in a plastic manner. By way of example only, one possible choice of materials would be a restraining tube 110 of ordinary steel pipe and a tube expander 130 of high carbon steel, chromium steel, vanadium steel, or the like.

Plastic deformation of the restraining tube 110 on multiple pipe sections 10 will dissipate a great deal of explosive energy in a quick and controlled manner. It is believed that although the restraining tube 110 and the pipe sections 10 to which they are welded may become permanently deformed or damaged, that they will not be allowed to move in an uncontrolled manner. Thus, it is possible to defuse or at least significantly lessen the explosive effects of a potential pipe failure either within an individual pipe section 10 or at a joint 20 between pipe sections 10 in such a way as to minimize potential damage to both people and equipment.

Of course, the restraining system 100 constructed in accordance with the present invention may also be modified to create various alternative embodiments. As noted briefly hereinabove, it is desirable to minimize any slack in the wire rope 120 of the restraining tube 110. This is because slack in the wire rope 120 will allow a certain amount of energy from escaping effluent to be converted into kinetic energy before it can be dissipated. It has been indicated that typically the wire rope 120 will be about the same length or about 1 to 2 inches longer than the restraining tube 110. This small amount of slack would probably be acceptable for most applications and would ease both the manufacture of the pipe sections 10 and the process of connecting them in series to form a flowline. However, it is believed that by making the wire rope 120 slightly shorter in length than the restraining tube 110 and by forming the smaller end 132 of the tube expanders 130 to fit partially within the restraining tube 110 the amount of slack in the wire rope 120 could be reduced. Also, by carefully aligning the restraining tubes 110 of adjacent pipe sections 10 along a common axis, the required length of each connection assembly 40 and the amount of slack in the wire ropes 120 could be further reduced.

While a preferred embodiment of the invention has been shown and described herein, modifications may be made by one skilled in the art without departing from the spirit and the teachings of the invention. The embodiments described herein are exemplary only, and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalents of the subject matter of the claims.

What is claimed is:

1. A restraining system for pipe comprising:
   a restraining tube fixedly attached to an exterior surface of the pipe;
   a cable disposed within the restraining tube; and
   a tube expander fixedly attached to an end of the cable such that the restraining tube undergoes plastic deformation by the tube expander to restrain the pipe.

2. The restraining system according to claim 1, wherein the restraining tube has an inner diameter and the tube expander is tapered to have a smaller end with a diameter less than the inner diameter of the restraining tube and a larger end with a diameter greater than the inner diameter of the restraining tube.

3. A restraining system for pipe comprising:
   a restraining tube fixedly attached to an exterior surface of the pipe;
   a cable disposed with the restraining tube; and
   a tube expander fixedly attached to an end of the cable, wherein the restraining tube has an inner diameter and the tube expander is tapered to have a smaller end with a diameter less than the inner diameter of the restraining tube and a larger end with a diameter greater than the inner diameter of the restraining tube, and wherein the tube expander is fixedly attached to the cable at the smaller end and the tube expander further comprises a threaded bolt portion at the larger end.

4. The restraining system according to claim 2, wherein the tube expandor is sized with the larger end at least about 0.5% greater in diameter than the inner diameter of the restraining tube.

5. The restraining system according to claim 1, wherein the tube expander is formed of a hardened steel alloy.

6. The restraining system according to claim 1, wherein the cable has a length that is at least equal to that of the restraining tube.

7. The restraining system according to claim 1, wherein the cable is a wire rope.

8. The restraining system according to claim 1, further comprising a second tube expander fixedly attached to another end of the cable.

9. A restraining system for a plurality of pipe sections comprising:
   a restraining tube fixedly attached to an exterior surface of each pipe section;
   a cable disposed within each restraining tube; and
   a pair of tube expanders fixedly attached to each cable at opposite ends;
   wherein each tube expander is tapered in diameter with a smaller end attached to the respective cable and a larger end having a threaded bolt portion extending outward from the larger end.

10. The restraining system according to claim 9, wherein the plurality of pipe sections are connected in series.

11. The restraining system according to claim 10, further comprising a connection assembly for mechanically linking the threaded bolt portions of two tube expanders located adjacent a joint between two of the pipe sections connected in series.

12. The restraining system according to claim 11, wherein the connection assembly comprises:
   a connection cable; and
   a pair of threaded nuts fixedly attached at opposite ends of the connection cable.

13. The restraining system according to claim 12, wherein the threaded nuts are sized to engage the threaded bolt portions of the tube expanders.

14. The restraining system according to claim 12, wherein the connection cable is a wire rope.

15. The restraining system according to claim 9, wherein each restraining tube has an inner diameter and the pair of tube expanders attached to the cable disposed in each restraining tube are each sized such that the diameter of the smaller end is less than the inner diameter of the respective restraining tube and the diameter of the larger end is greater than the inner diameter of the respective restraining tube.

16. The restraining system according to claim 9, wherein each pair of tube expanders are each sized with the larger end at least about 0.5% greater in diameter than an inner diameter of the restraining tube containing the cable to which the pair of tube expanders are attached.

17. The restraining system according to claim 9, wherein each tube expander is formed of a hardened steel alloy.

18. The restraining system according to claim 9, wherein each cable has a length that is at least equal to that of the restraining tube in which the cable is disposed.

19. The restraining system according to claim 9, wherein each cable is a wire rope.

20. A method or restraining a plurality of pipe sections connected in series to form a flowline, the method comprising the steps of:
   providing a restraining tube fixedly attached to an exterior surface of each pipe section;
   disposing a cable in each restraining tube;
   attaching a tube expander at opposite ends of each cable; and
   connecting the plurality of cables in series such that energy released by failure of a pipe section or a joint between pipe sections is dissipated across the entire flowline via plastic deformation of one or more restraining tubes.

21. The method according to claim 20, wherein the plurality of restraining tubes are substantially aligned along a common axis.

* * * * *